(12) United States Patent
Shimura et al.

(10) Patent No.: US 11,440,530 B2
(45) Date of Patent: Sep. 13, 2022

(54) SPEED CHANGE CONTROL SYSTEM FOR VEHICLE

(71) Applicant: TOYOTA JIDOSHA KABUSHIKI KAISHA, Toyota (JP)

(72) Inventors: Soichiro Shimura, Numazu (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/740,758

(22) Filed: Jan. 13, 2020

(65) Prior Publication Data

US 2020/0223427 A1   Jul. 16, 2020

(30) Foreign Application Priority Data

Jan. 15, 2019   (JP) .............................. JP2019-004049

(51) Int. Cl.
*B60W 20/15* (2016.01)
*B60K 6/26* (2007.10)
(Continued)

(52) U.S. Cl.
CPC ............... *B60W 20/15* (2016.01); *B60K 6/24* (2013.01); *B60K 6/26* (2013.01); *B60K 6/28* (2013.01); *B60K 6/36* (2013.01); *B60K 6/543* (2013.01); *B60L 15/20* (2013.01); *B60W 10/06* (2013.01); *B60W 10/08* (2013.01); *B60W 10/101* (2013.01); *F02D 41/023* (2013.01); *B60Y 2200/92* (2013.01); *B60Y 2300/188* (2013.01);
(Continued)

(58) Field of Classification Search
None
See application file for complete search history.

(56) References Cited

U.S. PATENT DOCUMENTS 8,147,367 B2 *  4/2012  Seo ......................... F16H 3/728
                                                                 475/5
8,287,412 B2 * 10/2012  Lee ......................... B60K 6/365
                                                                 475/5
(Continued)

FOREIGN PATENT DOCUMENTS

EP          3106338 A1 * 12/2016  ............. B60K 6/365
EP          3184338 A1 *  6/2017  ............... B60K 6/24
(Continued)

OTHER PUBLICATIONS

Reasons for Refusal (dated 2022).*

*Primary Examiner* — Dirk Wright
(74) *Attorney, Agent, or Firm* — Sughrue Mion, PLLC

(57) ABSTRACT

A speed change control system for a vehicle configured to reduce uncomfortable feeling of a driver when shifting an operating mode via the fixed mode. When a required drive force to propel the vehicle is increased, a controller shifts the operating mode from a first continuously variable mode to a second continuously variable mode via a fixed mode. In this case, the controller increases an engine speed to a first target speed from a point when shifting from the fixed mode to the second continuously variable mode, and further increase the engine speed to a second target speed calculated based on the required drive force. In addition, the controller reduces the first target speed with an increase in at least any one of a first elapsed time and a second elapsed time.

7 Claims, 12 Drawing Sheets

(51) Int. Cl.
  B60K 6/28    (2007.10)
  B60K 6/36    (2007.10)
  F02D 41/02   (2006.01)
  B60K 6/543   (2007.10)
  B60L 15/20   (2006.01)
  B60W 10/06   (2006.01)
  B60W 10/08   (2006.01)
  B60W 10/101  (2012.01)
  B60K 6/24    (2007.10)

(52) U.S. Cl.
  CPC .. *F02D 2200/501* (2013.01); *F02D 2200/602* (2013.01)

(56) References Cited

U.S. PATENT DOCUMENTS

| | | | | |
|---|---|---|---|---|
| 8,303,447 | B1* | 11/2012 | Kim | B60L 50/61 475/284 |
| 8,313,401 | B2* | 11/2012 | Kim | B60K 6/365 475/5 |
| 8,371,975 | B2* | 2/2013 | Seo | B60K 6/40 475/5 |
| 8,491,438 | B2* | 7/2013 | Kim | F16H 3/728 475/5 |
| 8,500,585 | B2* | 8/2013 | Kim | F16H 3/728 475/5 |
| 8,597,147 | B2* | 12/2013 | Kim | B60K 6/365 475/5 |
| 8,894,527 | B2* | 11/2014 | Choi | B60K 6/445 475/284 |
| 9,174,523 | B2* | 11/2015 | Lee | B60K 6/365 |
| 9,193,253 | B2* | 11/2015 | Lee | B60K 6/387 |
| 9,988,052 | B2* | 6/2018 | Tsuruta | B60W 20/00 |
| 2010/0273593 | A1* | 10/2010 | Seo | B60K 6/445 475/5 |
| 2010/0273595 | A1* | 10/2010 | Seo | B60K 6/445 475/5 |
| 2011/0111907 | A1* | 5/2011 | Kim | B60K 6/365 475/5 |
| 2011/0111908 | A1* | 5/2011 | Kim | B60K 6/365 475/5 |
| 2011/0111909 | A1* | 5/2011 | Kim | F16H 3/728 475/5 |
| 2015/0005129 | A1* | 1/2015 | Lee | B60K 6/445 475/5 |
| 2015/0360681 | A1* | 12/2015 | Kanayama | B60K 6/365 180/65.265 |
| 2016/0325747 | A1 | 11/2016 | Tsuruta et al. | |

FOREIGN PATENT DOCUMENTS

| | | |
|---|---|---|
| JP | 2015-132230 A | 7/2015 |
| JP | 2016-041527 A | 3/2016 |
| JP | 2018-135053 A | 8/2018 |

* cited by examiner

Fig. 2

| Operating Mode | | CL1 | CL2 | B1 | MG1 | MG2 | ENG |
|---|---|---|---|---|---|---|---|
| HV Mode | HV-Low Mode During Propulsion | ● | — | — | G | M | ON |
| | HV-Low Mode During Deceleration | ● | — | — | M | G | OFF |
| | HV-High Mode During Propulsion | — | ● | — | G | M | ON |
| | HV-High Mode During Deceleration | — | ● | — | M | G | OFF |
| | Fixed Mode Propulsion & Deceleration | ● | ● | — | | | ON |
| EV Mode | Dual-Motor Mode EV-Low Mode | ● | — | ● | M | M | OFF |
| | Dual-Motor Mode EV-High Mode | — | ● | ● | M | M | OFF |
| | Single-Motor Mode | — | — | — | | M | OFF |

SPEED CHANGE CONTROL SYSTEM FOR VEHICLE

CROSS-REFERENCE TO RELATED APPLICATIONS

The present disclosure claims the benefit of Japanese Patent Application No. 2019-004049 filed on Jan. 15, 2019 with the Japanese Patent Office, the disclosures of which are incorporated herein by reference in its entirety.

BACKGROUND

Field of the Disclosure

Embodiments of the present disclosure relate to the art of a speed change control system for a vehicle to control a speed ratio of a transmission when accelerating the vehicle.

Discussion of the Related Art

JP-A-2018-135053 describes a drive system for a vehicle comprising: a first planetary gear unit having a first rotary element connected to an engine, a second rotary element connected to a motor, and a third rotary element; a second planetary gear unit having a fourth rotary element connected to drive wheels in a torque transmittable manner, a fifth rotary element connected to the third rotary element, and a sixth rotary element; a first clutch device that selectively connects the first rotary element to the sixth rotary element; and a second clutch device that selectively connects any two of the fourth rotary element, the fifth rotary element, and the sixth rotary element. In the drive system taught by JP-A-2018-135053, an operating mode can be selected from a Low mode in which the first clutch device is engaged, a High mode in which the second clutch device is engaged, and a fixed mode in which the first clutch device and the second clutch device are engaged.

JP-A-2016-041527 describes an engine control unit for controlling a speed of an engine when accelerating a vehicle. In order to change the engine speed to achieve an expected acceleration, the engine control unit taught by JP-A-2016-041527 is configured to set a target engine speed when the engine speed reaches a threshold speed during acceleration. The engine control unit taught by JP-A-2016-041527 is further configured to set the target engine speed in such a manner that the engine speed is increased with a lapse of time from a point at which the vehicle is accelerated.

JP-A-2015-132230 describes a vehicle provided with an electric control unit configured to increase an engine speed gradually from a point at which an acceleration request is made by an user. The electric control unit controls the engine to suppress a change in the engine speed due to a change of the operation mode in a case where the control throttle opening is changed across the predetermined threshold in response to the change of the operation mode.

According to the teachings of JP-A-2018-135053, a speed of the engine may be changed continuously in the Low mode and the High mode so that an expected acceleration is achieved by controlling the speed of the engine in accordance with a change in a vehicle speed or an acceleration. However, when an accelerator pedal is depressed deeper than a predetermined position, or when a vehicle speed is increased higher than a predetermined level, the operating mode has to be shifted from the High mode to the Low mode to prevent rotary members of the drive system to be rotated at an extremely high speed. In order to avoid a reduction is a drive force during a transient state of a shifting operation from the Low mode to the High mode, according to the teachings of JP-A-2018-135053, the operating mode is shifted from the Low mode to the High mode through the fixed mode. Therefore, when the depression of the accelerator pedal exceeds the predetermined level so that the operating mode is shifted to the fixed mode, the speed of the engine is maintained in accordance with the vehicle speed until the operating mode is shifted from the fixed mode to the Low mode. For this reason, if the speed of the engine is increased at the timing different from an intended timing after the operating mode is shifted to the Low mode, a driver may not recognize that such rise in speed of the engine is caused by depressing the accelerator pedal.

SUMMARY

Aspects of embodiments of the present disclosure have been conceived noting the foregoing technical problems, and it is therefore an object of the present disclosure to provide a speed change control system for a vehicle configured to reduce uncomfortable feeling of a driver when shifting an operating mode via the fixed mode.

The speed change control system according to the exemplary embodiment of the present disclosure is applied to a vehicle comprising an engine, and a speed change mechanism that is connected to the engine. Specifically, the speed change mechanism is adapted to shift an operating mode among: a first continuously variable mode in which a speed of the engine may be varied continuously; a second continuously variable mode in which the speed of the engine may also be varied continuously; and a fixed mode in which a speed ratio between the engine and a pair of drive wheels is fixed to a predetermined value. In order to achieve the above-explained objective, according to the exemplary embodiment of the present disclosure, the control system is provided with a controller that controls the speed change mechanism. The controller is configured to: shift the operating mode between the first continuously variable mode and the second continuously variable mode via the fixed mode when a required drive force to propel the vehicle is increased; increase the speed of the engine to a first target speed from a point at which the operating mode is shifted from the fixed mode to the second continuously variable mode; further increase the speed of the engine to a second target speed calculated based on the required drive force; and set the first target speed to a smaller value with an increase in at least any one of a first elapsed time and a second elapsed time. Specifically, the first elapsed time is counted from a point at which the required drive force is increased to a point at which the operating mode is shifted from the fixed mode to the second continuously variable mode. On the other hand, the second elapsed time is counted from a point at which a change rate of longitudinal acceleration of the vehicle is reduced less than a predetermined value to the point at which the operating mode is shifted from the fixed mode to the second continuously variable mode.

In a non-limiting embodiment, the vehicle may further comprise: a motor that is connected to the pair of drive wheels or another pair of drive wheels in a torque transmittable manner; and an electric storage device that supplies electricity to the motor. The controller may be further configured to: achieve the required drive force by delivering a torque of the motor to the pair of drive wheels or the another pair of drive wheels in addition to deliver a torque of the engine to the pair of drive wheels, during a transitional state of shifting the operating mode from the first continuously variable mode to the second continuously variable mode; and increase the first target speed with a with a reduction in a state of charge level of the electric storage device.

In a non-limiting embodiment, the controller may be further configured to employ the speed of the engine at the point when the operating mode is shifted from the fixed mode to the second continuously variable mode as a lower limit guard value of the first target speed.

In a non-limiting embodiment, the controller may be further configured to employ the second target speed as an upper limit guard value of the first target speed.

In a non-limiting embodiment, the controller may be further configured to set an increasing rate of the speed of the engine to a maximum increasing rate, during a period from the point at which the operating mode is shifted from the fixed mode to the second continuously variable mode to a point at which the speed of the engine reaches the first target speed.

In a non-limiting embodiment, the controller may be further configured to calculate the increasing rate of the speed of the engine from the first target speed to the second target speed based on a speed of the vehicle, the longitudinal acceleration of the vehicle, and a position of an accelerator pedal.

In a non-limiting embodiment, the controller may be further configured to switch the increasing rate of the speed of the engine to the maximum increasing rate when the required drive force is increased greater than a predetermined value during a transitional state of increasing the speed of the engine from the first target speed to the second target speed.

Thus, according to the exemplary embodiment of the present disclosure, the operating mode of the vehicle is shifted from the first continuously variable mode to the second continuously variable mode via the fixed mode when the required drive force to propel the vehicle in increased. In this situation, the controller increases the speed of the engine to the first target speed from the point at which the operating mode is shifted from the fixed mode to the second continuously variable mode, and thereafter increase the speed of the engine to the second target speed calculated based on the required drive force. In addition, the controller set the first target speed to the smaller value with an increase in at least any one of the first elapsed time and the second elapsed time. As described, the first elapsed time is counted from the point at which the required drive force is increased to the point at which the operating mode is shifted from the fixed mode to the second continuously variable mode. On the other hand, the second elapsed time is counted from the point at which the change rate of the longitudinal acceleration of the vehicle is reduced less than the predetermined value to the point at which the operating mode is shifted from the fixed mode to the second continuously variable mode. According to the exemplary embodiment of the present disclosure, therefore, a driver is allowed to recognize that the speed of the engine is increased as a result of depressing the accelerator pedal, even if the speed of the engine is increased after shifting the operating mode from the fixed mode to the second continuously variable mode. For this reason, uncomfortable feeling of the driver may be reduced.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 2 is a table showing engagement states of engagement devices and operating conditions of the prime movers in each operating mode;

DETAILED DESCRIPTION OF THE PREFERRED EMBODIMENT(S)

Figure 1:
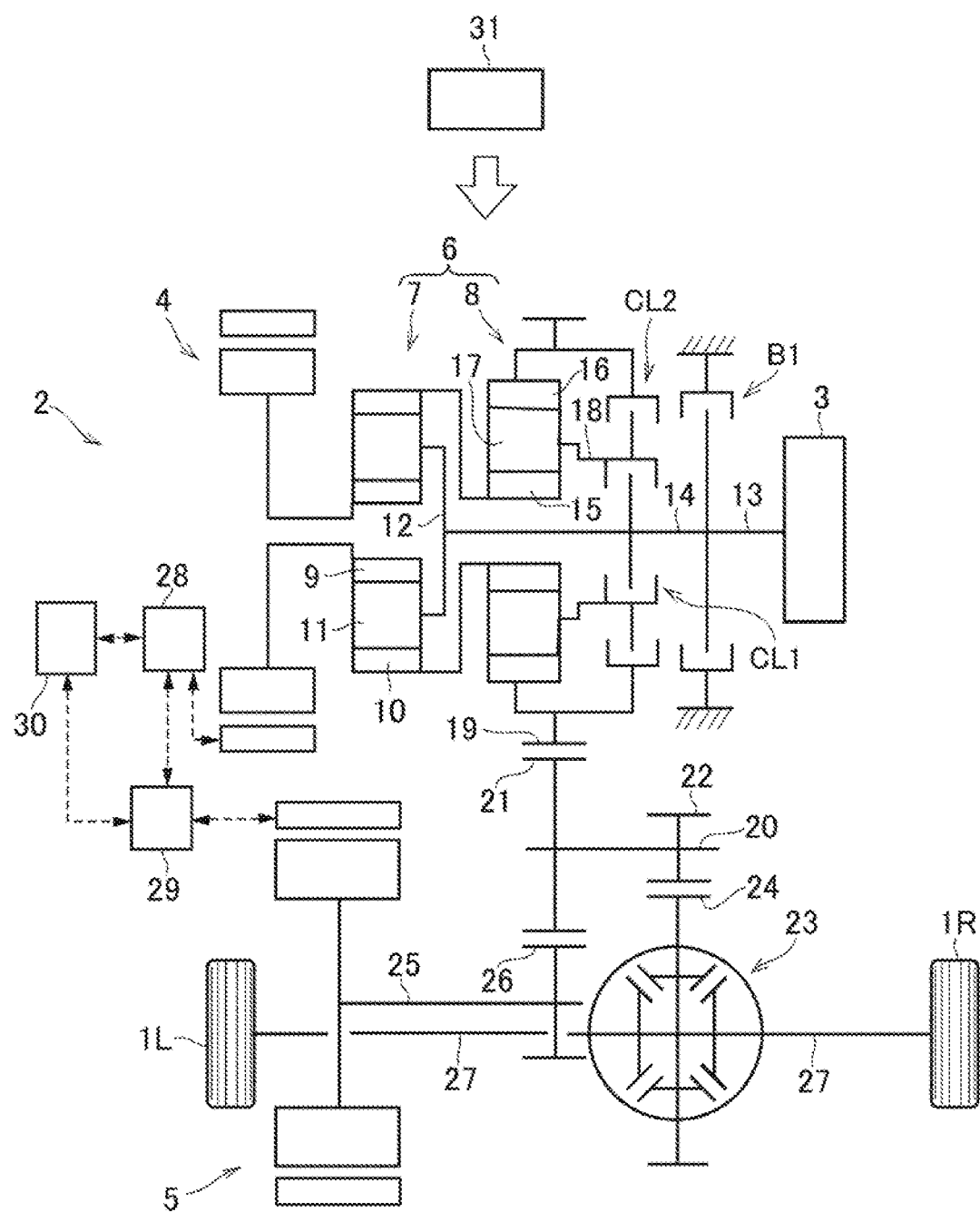
FIG. 1 is a skeleton diagram schematically showing a structure of a vehicle to which the control system according to the exemplary embodiment of the present disclosure is applied.

An exemplary embodiment of the present disclosure will now be explained with reference to the accompanying drawings. Referring now to FIG. 1, there is shown one example of a drive unit 2 of a hybrid vehicle (as will be simply called the "vehicle" hereinafter) to which the control system according to the exemplary embodiment of the present disclosure is applied. A prime mover of the drive unit 2 comprises an engine 3, a first motor 4 and a second motor 5. Specifically, the first motor 4 is a motor-generator having a generating function (referred to as "MG1" in the drawings). In the vehicle according to the exemplary embodiment, a speed of the engine 3 is controlled by the first motor 4, and the second motor 5 is driven by electric power generated by the first motor 4 to generate a drive force for propelling the vehicle. The motor-generator having a generating function may also be adopted as the second motor 5 (referred to as "MG2" in the drawings).

A power split mechanism 6 as a speed change mechanism is connected to the engine 3. The power split mechanism 6 includes a power split section 7 that distributes power generated by the engine 3 to the first motor 4 side and to an output side, and a transmission section 8 that alters a torque split ratio.

For example, a single-pinion planetary gear unit adapted to perform differential action among three rotary elements may be employed as the power split section 7. Specifically, the power split section 7 comprises: a sun gear 9; a ring gear 10 as an internal gear arranged concentrically with the sun gear 9; pinion gears 11 interposed between the sun gear 9 and the ring gear 10 while being meshed with both gears 9 and 10; and a carrier 12 supporting the pinion gears 11 in a rotatable manner. In the power split section 7, accordingly, the sun gear 9 mainly serves as a reaction element, the ring gear 10 mainly serves as an output element, and the carrier 12 mainly serves as an input element.

An output shaft 13 of the engine 3 is connected to an input shaft 14 of the power split mechanism 6 connected to the carrier 12 so that the power of the engine 3 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 4. In the drive unit 2 shown in FIG. 1, the power split section 7 and the first motor 4 are arranged concentrically with a rotational center axis of the engine 3, and the first motor 4 is situated on an opposite side of the engine 3 across the power split section 7. The transmission section 8 is interposed coaxially between the power split section 7 and the engine 3.

The transmission section 8 is also a single-pinion planetary gear unit comprising: a sun gear 15; a ring gear 16 as an internal gear arranged concentrically with the sun gear 15; pinion gears 17 interposed between the sun gear 15 and the ring gear 16 while being meshed with both gears 15 and 16; and a carrier 18 supporting the pinion gears 17 in a rotatable manner. Thus, the transmission section 8 is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19.

In order to use the power split section 7 and the transmission section 8 as a complex planetary gear unit, a first clutch CL1 is disposed to selectively connect the carrier 18 of the transmission section 8 to the carrier 12 of the power split section 7. To this end, for example, a wet-type multiple plate friction clutch or a dog clutch may be adopted as the first clutch CL1. In the drive unit 2, specifically, a dog clutch is adopted as the first clutch CL1. Thus, in the drive unit 2 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element.

A second clutch CL2 is arranged to rotate the rotary elements of the transmission section 8 integrally. For example, a friction clutch and a dog clutch may also be adopted as the second clutch CL2 to selectively connect the carrier 18 to the ring gear 16 or the sun gear 15, or to connect the sun gear 15 to the ring gear 16. In the drive unit 2 shown in FIG. 1, specifically, a dog clutch is adopted as the second clutch CL2 to connect the carrier 18 to the ring gear 16 to rotate the rotary elements of the transmission section 8 integrally. The first clutch CL1 and the second clutch CL2 are arranged coaxially with the engine 3, the power split section 7, and the transmission section 8 on the opposite side of the power split section 7 across the transmission section 8. The first clutch CL1 and the second clutch CL2 may be arranged not only in parallel to each other in a radial direction but also in tandem in an axial direction. In the drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced in a case of using the friction clutch as the second clutch CL2.

A counter shaft 20 extends parallel to a common rotational axis of the engine 3, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction. The driven gear 21 is also meshed with a drive gear 26 fitted onto a rotor shaft 25 of the second motor 5 so that power or torque of the second motor 5 is synthesized with power or torque of the output gear 19 at the driven gear 21 to be distributed from the differential gear unit 23 to the front wheels 1R and 1L via each of the drive shafts 27. Instead, the second motor 5 may also be connected to a pair of rear wheels (not shown) in a torque transmittable manner.

In order to selectively stop a rotation of the output shaft 13 or the input shaft 14 for the purpose of delivering the drive torque generated by the first motor 4 to the front wheels 1R and 1L, a first brake B1 is arranged in the drive unit 2. For example, a frictional engagement device or a dog brake may be adopted as the first brake B1. Specifically, by applying the first brake B1 to halt the output shaft 13 or the input shaft 14, the carrier 12 of the power split section 7 and the carrier 18 of the transmission section 8 are allowed to serve as reaction elements, and the sun gear 9 of the power split section 7 is allowed to serve as an input element. To this end, the first brake B1 may be adapted to stop the rotation of the output shaft 13 or the input shaft 14 not only completely but also incompletely to apply a reaction torque to those shafts when the first motor 4 generates a drive torque. Alternatively, a one-way clutch may be used instead of the first brake B1 to restrict a reverse rotation of the output shaft 13 or the input shaft 14.

A first power control system 28 is connected to the first motor 4, and a second power control system 29 is connected to the second motor 5. Each of the first power control system 28 and the second power control system 29 individually includes an inverter and a converter. The first power control system 28 and the second power control system 29 are connected to each other, and also connected individually to an electric storage device 30 including a lithium ion battery and a capacitor. For example, when the first motor 4 is operated as a generator while establishing a reaction torque, an electric power generated by the first motor 4 may be supplied directly to the second motor 5 without passing through the electric storage device 30.

In order to control the first power control system 28, the second power control system 29, the engine 3, the first clutch CL1, the second clutch CL2, and the brake B1, the vehicle is provided with an electronic control unit (to be abbreviated as the "ECU" hereinafter) 31 as a controller. The ECU 31 comprises a microcomputer as its main constituent that is configured to execute a calculation based on incident data transmitted from sensors as well as maps and formulas installed in advance, and transmits a calculation result to the power control systems 28 and 29, the engine 3, the clutches CL1 and CL2, the brake B1 and so on in the form of command signal. For example, the ECU 31 receives data about; a vehicle speed; an accelerator position; a speed of the first motor 4; a speed of the second motor 5; a speed of the output shaft 13 of the engine 3; an output speed such as a speed of the ring gear 16 of the transmission section 8 or the counter shaft 20; strokes of pistons of the clutches CL1 and CL2 and the brake B1; a temperature of the electric storage device 30; temperatures of the power control systems 28 and 29; a temperature of the first motor 4; a temperature of the second motor 5; a temperature of oil (i.e., ATF) lubricating the power split section 7 and the transmission section 8; a state of charge (to be abbreviated as the "SOC" hereinafter) level of the battery 30; a temperature of a catalyst (not shown) purifying exhaust gas of the engine 3 and so on.

Specifically, command signals of output torques and speeds of the first motor 4, the second motor 5 and the engine 3, are transmitted from the ECU 31 to those devices. Likewise, command signals of torque transmitting capacities (including "0") of the clutches CL1 and CL2, and the brake B1 are transmitted from the ECU 31 to those devices.

The command signals transmitted to the first motor 4 and the second motor 5 include command signals for controlling current applied to the first motor 4 and the second motor 5, a command signal for controlling a frequency of a current generated by the inverter, and a command signal for controlling a voltage boosted by the converter. The command signal transmitted to the engine 3 includes command signals for controlling currents to control opening degrees of an electronic throttle valve, an EGR (Exhaust Gas Restriction) valve, an intake valve, and an exhaust valve, and a current to activate an ignition plug. Thus, the command signals transmitted to the engine 3 includes the command signals for controlling a power, an output torque and a speed of the engine 3. The command signals transmitted to the first clutch CL1, the second clutch CL2, and the brake B1 include command signals for controlling currents supplied to actuators engaging/disengaging the clutches CL1 and CL2, and the brake B1. Given that a friction clutch is adopted as the first clutch CL1, the second clutch CL2, and the brake B1 respectively, the command signals are transmitted to actuators of the clutches CL1 and CL2, and the brake B1 to control engagement pressures of those engagement devices.

In the vehicle having the drive unit 2, an operating mode may be selected from a hybrid mode (to be abbreviated as the "HV mode" hereinafter) and an electric vehicle mode (to be abbreviated as the "EV mode" hereinafter). In the HV mode, the vehicle is propelled by a drive torque generated by the engine 3, and the vehicle may be decerebrated utilizing a braking force derived from a pumping loss of the engine 3. The HV mode may be selected from a hybrid-low mode (to be abbreviated as the "HV-Low mode" hereinafter), a hybrid-high mode (to be abbreviated as the "HV-High mode" hereinafter), and a fixed mode. Specifically, in the HV-Low mode, a rotational speed of the engine 3 (i.e., a rotational speed of the input shaft 14) is increased higher than a rotational speed of the ring gear 16 of the transmission section 8 when a rotational speed of the first motor 4 is reduced substantially to zero. In the HV-High mode, a rotational speed of the engine 3 (i.e., a rotational speed of the input shaft 14) is reduced lower than a rotational speed of the ring gear 16 of the transmission section 8 when a rotational speed of the first motor 4 is reduced substantially to zero. In the fixed mode, the engine 3 (or the input shaft 14) and the ring gear 16 of the transmission section 8 are rotated at substantially same speeds. In the HV-High mode and the HV-Low mode, a speed of the engine 3 may be changed by varying a speed of the first motor 4. Since a rotational speed of the first motor 4 may be varied continuously, in the HV-Low mode and the HV-High mode, a speed ratio between the engine 3 and the ring gear 16 (i.e., an output speed) may be varied continuously. Accordingly, the HV-High mode may also be called a first continuously variable mode, and the HV-Low mode may also be called a second continuously variable mode. By contrast, in the fixed mode, a speed of the engine 3 is fixed in accordance with a speed of the vehicle.

In the EV mode, the vehicle is propelled by drive torques generated by the first motor 4 and the second motor 5 without using the engine 3. The EV mode may be selected from a dual-motor mode in which both of the first motor 4 and the second motor 5 generate drive torques to propel the vehicle, and a single-motor mode in which only the second motor 5 generates a drive torque to propel the vehicle. Further, the dual-motor mode may be selected from an electric vehicle-low mode (to be abbreviated as the "EV-Low mode" hereinafter) in which a torque of the first motor 4 is multiplied by a relatively larger factor, and an electric vehicle-high mode (to be abbreviated as the "EV-High mode" hereinafter) in which a torque of the first motor 4 is multiplied by a relatively smaller factor. In the single-motor mode, the hybrid vehicle 1 is powered only by the second motor 5, while engaging the first clutch CL1, while engaging the second clutch CL2, or while disengaging both of the first clutch CL1 and the second clutch CL2.

Figure 4:
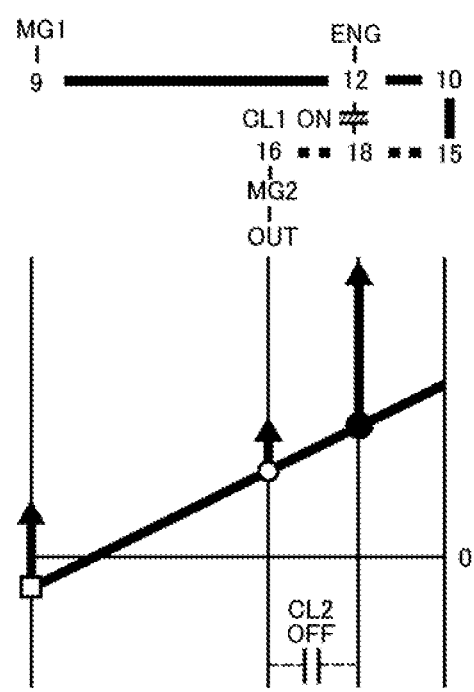
FIG. 4 is a nomographic diagram showing a situation in a HV-Low mode.

FIG. 2 shows engagement states of the first clutch CL1, the second clutch CL2, and the first brake B1, and operating conditions of the first motor 4, the second motor 5, and the engine 3 in each operating mode. In FIG. 4, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle, "ON" represents that the engine 3 generates a drive torque, and "OFF" represents that the engine 3 does not generate a drive torque. During propulsion in the single-motor mode, an output power of the engine 3 may be translated entirely into an electric energy by operating the first motor 4 as a generator. In this case, since the engine 3 does not serve as a prime mover, the status of the engine 3 is indicated as "OFF" in FIG. 2.

Figure 3:
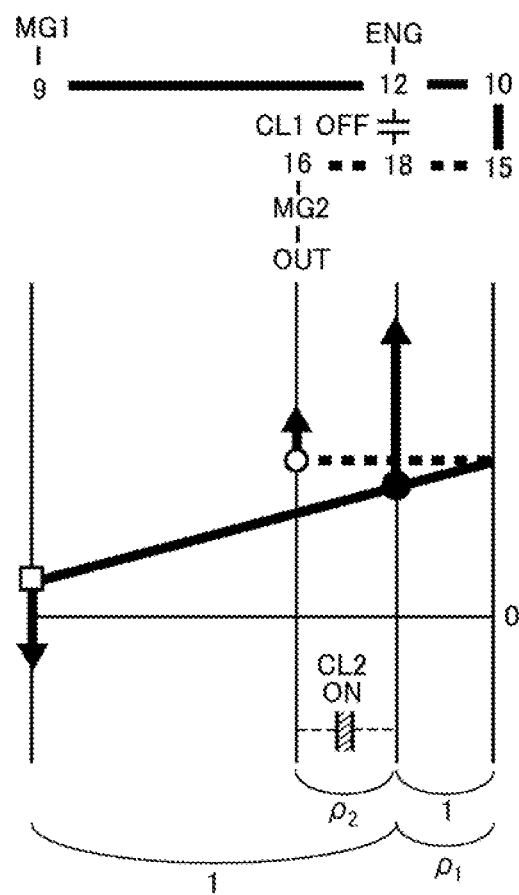
FIG. 3 is a nomographic diagram showing a situation in a HV-High mode.

Rotational speeds of the rotary elements of the power split mechanism 6, and directions of torques of the engine 3, the first motor 4, and the second motor 5 in the HV-High mode and the HV-Low mode are indicated in FIGS. 3 and 4. In the nomographic diagrams shown in FIGS. 3 and 4, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 5:
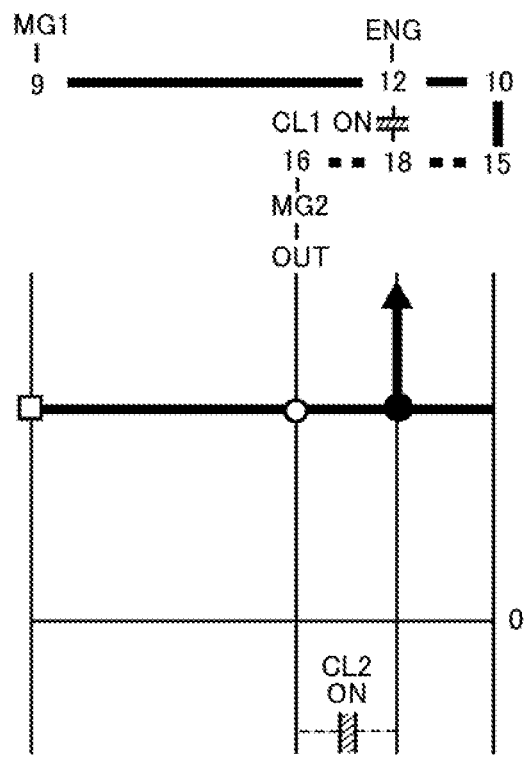
FIG. 5 is a nomographic diagram showing a situation in a fixed mode.

As indicated in FIGS. 3 and 4, in the HV-High mode and the HV-Low mode, any one of the first clutch CL1 and the second clutch CL2 is engaged, and the engine 3 generates a drive torque. In this situation, the first motor 4 generates a reaction torque to suppress an increase in the speed of the engine 3 so that an output torque of the engine 3 is transmitted through the power split mechanism 6. As indicated in FIGS. 4 and 5, an output torque of the power split mechanism 6 differs between the HV-High mode and the HV-Low mode. In other words, a split ratio of the output torque of the engine 3 delivered to the ring gear 16 through the power split mechanism 6 differs between the HV-High mode and the HV-Low mode.

Specifically, a ratio of the output torque of the engine 3 delivered to the ring gear 16 in the HV-Low mode may be expressed as "$1/(1-(\rho 1 \cdot \rho 2))$", and a ratio of the output torque of the engine 3 delivered to the ring gear 16 in the HV-High mode may be expressed as "$1/(\rho 1+1)$". In the above-expressed expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are individually smaller than "1". That is, in the HV-Low mode, a ratio of the output torque of the engine 3 delivered to the ring gear 16 is increased in comparison with that in the HV-High mode. On the other hand, a ratio of the output torque of the engine 3 delivered to the first motor 4 in the HV-Low mode may be expressed as "$(\rho 1 \cdot \rho 2)/(1-(\rho 1-\rho 2))$", and a ratio of the output torque of the engine 3 delivered to the first motor 4 in the HV-High mode may be expressed as "$\rho 1/(\rho 1+1)$". In the HV-Low mode and the HV-High mode, rotational speeds of the rotary elements of the power split mechanism 6 are maintained by generating a torque by the first motor 4 to balance out the torque delivered to the first motor 4 so that the output torque of the engine 3 is delivered to the ring gear 16.

Here, when the speed of the engine 3 is increased by the torque generated by the engine 3, a torque required to increase the speed of the engine 3 is subtracted from the output torque of the engine 3. That is, an actual output torque of the output shaft 13 of the engine 3 corresponds to the output torque of the engine 3.

As described, in the case of generating the drive torque by the engine 3 while generating the reaction torque by the first motor 4, a rotational speed of the first motor 4 is controlled in such a manner as to adjust the speed of the engine 3 to a target speed. For example, the target speed of the engine 3 is set in such a manner as to optimize a total energy efficiency in the drive unit 2 including a fuel efficiency of the engine 3 and a driving efficiency of the first motor 4. Specifically, the total energy efficiency in the drive unit 2 may be calculated by dividing a total energy consumption by a power to rotate the front wheels 1R and 1L.

When establishing a reaction torque by the first motor 4 during propulsion of the vehicle, the first motor 4 serves as a generator to translate an output power of the engine 3 into an electric energy at least partially, and the remaining power of the engine 3 is delivered to the ring gear 16 of the transmission section 8. In this situation, the electric power generated by the first motor 4 is supplied to the second motor 5, and in addition, the electric power accumulated in the electric storage device 30 is also supplied to the second motor 5 as necessary.

As indicated in FIG. 5, in the fixed mode, both of the first clutch CL1 and the second clutch CL2 are engaged so that all of the rotary elements in the power split mechanism 6 are rotated at a same speed. In other words, the output power of the engine 3 will not be translated into an electric energy by the first motor 4 and the second motor 5. For this reason, a power loss associated with such energy conversion will not be caused in the fixed mode and hence power transmission efficiency can be improved. In the fixed mode, the vehicle may be propelled not only by the drive torque generated by the engine 3, but also by the drive torques generated by the first motor 4 and the second motor 5. Likewise, in the fixed mode, the vehicle may be decelerated not only by an engine braking torque generated by stopping fuel supply to the engine 3, but also by regenerative torque of the first motor 4 and the second motor 5.

Figure 6:
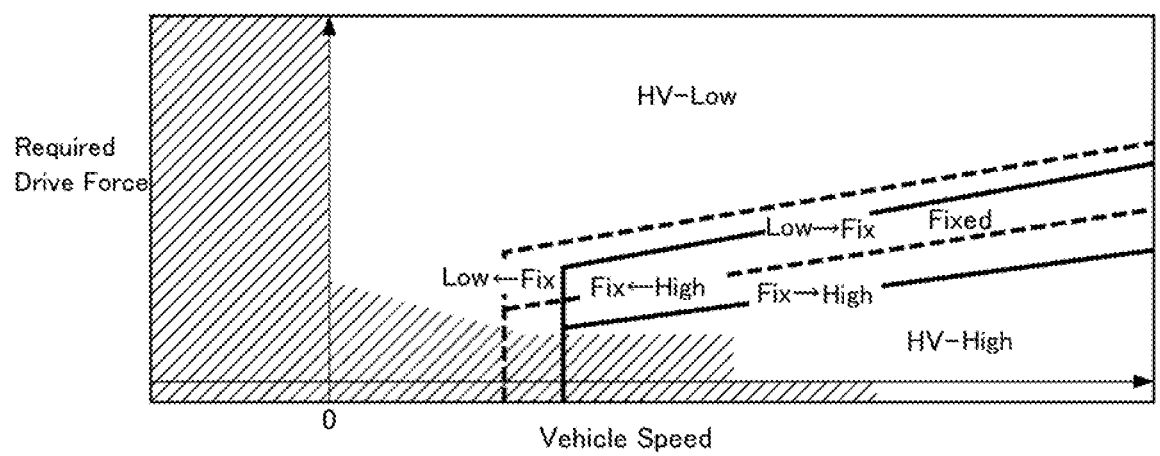
FIG. 6 is a map for determining an operating mode of the vehicle.

The operating mode of the vehicle is selected from the above-mentioned modes based on a speed of the vehicle and a required drive force, with reference to a map shown in FIG. 6. In FIG. 6, the vertical axis represents a required drive force, and the horizontal axis represents a vehicle speed. In order to select the operating mode of the vehicle, a speed of the vehicle may be detected by a vehicle speed sensor, and a required drive force may be estimated based on an accelerator position detected by an accelerator sensor.

In FIG. 6, the hatched area is an area where the single-motor mode is selected. Such area where the single-motor mode is selected is determined based on specifications of the second motor 5. As can be seen from FIG. 6, the single-motor mode is selected when the vehicle is propelled in a forward direction and the required drive force is relatively small.

During forward propulsion, the HV mode is selected when the large drive force is required. In the HV mode, the drive force may be generated from a low speed range to a high speed range. Therefore, when the SOC level falls close to a lower limit level, the HV mode may be selected even if an operating point governed by the required drive force and the vehicle speed falls within the hatched area.

As described, the HV mode may be selected from the HV-Low mode, the HV-High mode, and the fixed mode. Specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between an area where the HV-Low mode is selected and an area where the HV-High mode is selected.

The operating mode is shifted from the fixed mode to the HV-Low mode when the operating point is shifted across the "Lo←Fix" line from right to left, or when the operating point is shifted across the "Lo←Fix" line upwardly from the bottom. By contrast, the operating mode is shifted from the HV-Low mode to the fixed mode when the operating point is shifted across the "Lo→Fix" line from left to right, or when the operating point is shifted across the "Lo→Fix" line downwardly from the top. Likewise, the operating mode is shifted from the HV-High mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-High mode when the operating point is shifted across the "Fix→Hi" line from left to right, or when the operating point is shifted across the "Fix→Hi" line downwardly from the top. Thus, when shifting the operating mode between the HV-High mode and the HV-Low mode, the fixed mode is established temporarily. In other words, the operating mode is shifted between the HV-High mode and the HV-Low mode via the fixed mode.

In the map shown in FIG. 6, the areas of each of the operating mode and the lines defining the areas may be altered depending on temperatures of the members of the drive unit 2, the electric storage device 30, the power control systems 28 and 29, and the SOC level of the electric storage device 30. When the SOC level of the electric storage device 30 is sufficiently high, the operating mode of the vehicle may be selected with reference to another map determining regions to select the EV mode including the dual-motor mode.

As described, the control system according to the exemplary embodiment of the present disclosure is configured to reduce uncomfortable feeling of the driver resulting from a change in the speed of the engine 3 caused by shifting the operating mode from the HV-High mode to the HV-Low mode via the fixed mode. To this end, the ECU 31 executes a routine shown in FIG. 7. At step S1, it is determined whether an execution flag F is turned on to execute the speed change control to reduce uncomfortable feeling of the driver. Specifically, the execution flag F is turned on when shifting the operating mode from the HV-High mode to the HV-Low mode via the fixed mode.

If the speed change control has not yet been commenced, or if the execution flag F was turned off during the previous routine so that the answer of step S1 is NO, the routine progresses to step S2 to determine whether the accelerator pedal is depressed. That is, at step S2, an intension of the driver to increase the drive force is confirmed by determining whether the driver increases a depression of the accelerator pedal. Specifically, the answer of step S2 will be YES if a depressing speed of the accelerator pedal detected by the accelerator sensor is higher than a predetermined speed, and the accelerator pedal is depressed for a predetermined period of time. Instead, such determination at step S2 may also be made based on a fact that an amount of depression of the accelerator pedal is greater than a predetermined amount.

If the accelerator pedal is not depressed so that the answer of step S2 is NO, the routine returns. In this case, the HV-High mode is maintained and the speed of the engine 3 is controlled in an optimally fuel efficient manner based on the speed of the vehicle and the required drive force. By contrast, if the accelerator pedal is depressed so that the answer of step S2 is YES, the routine progresses to step S3 to determine whether it is required to shift the operating mode from the HV-High mode to the HV-Low mode via the fixed mode. Specifically, such determination at step S3 may be made based on a fact that the required drive force is increased to a value to shift the operating mode to the HV-Low mode as a result of depressing the accelerator pedal in the HV-High mode. Instead, such determination at step S3 may also be made based on a fact that the required drive force estimated based on a depressing speed of the accelerator pedal is expected to be increased to the value to shift the operating mode to the HV-Low mode.

If it is not required to shift the operating mode from the HV-High mode to the HV-Low mode via the fixed mode so that the answer of step S3 is NO, the routine returns. By contrast, if it is required to shift the operating mode from the HV-High mode to the HV-Low mode via the fixed mode so that the answer of step S3 is YES, the routine progresses to step S4 to turn on the execution flag F.

If the execution flag F is turned on so that the answer of step S1 is YES, or after the execution flag F was turned on at step S4, the routine progresses to step S5 to determine whether the shifting operation of the operating mode from the fixed mode to the HV Low mode has been completed. For example, such determination at step S5 may be made based on a fact that the first clutch CL1 has been engaged completely, and the second clutch CL2 has been disengaged completely.

If the determination at step S5 is made immediately after depressing the accelerator pedal, the vehicle may be still propelled in the HV High mode or the fixed mode. In this case, the answer of step S5 will be NO, and the routine progresses to step S6 to count a first elapsed time T1 from a point at which the depression of the accelerator pedal has started to increase, that is, from a point at which the affirmative determination was made at step S2. Specifically, the first elapsed time T1 may be calculated by adding a cycle time of the routine to the first elapsed time T1 counted so far. That is, the first elapsed time T1 is calculated continuously from the point at which the depression of the accelerator pedal has started to increase until the operating mode is shifted to the HV-Low mode and an affirmative determination will be made at step S5.

Then, it is determined at step S7 whether an absolute value of a change rate of longitudinal acceleration $|dG/dt|$ of the vehicle is less than a predetermined value $\alpha$. That is, at step S7, it is determined whether an actual drive force is increased to a required drive force governed by a position of the accelerator pedal. For example, the change rate of longitudinal acceleration $|dG/dt|$ may be calculated by differentiating a change rate of the vehicle speed twice. Instead, the change rate of longitudinal acceleration $|dG/dt|$ may be calculated by differentiating a detection value of an acceleration sensor. Here, a torque of the engine 3 may start increasing with a slight delay with respect to an increase in depression of the accelerator pedal. In this case, the drive force to propel the vehicle may be increased to the target drive force by increasing an output torque of the second motor 5.

If the absolute value of the change rate of longitudinal acceleration $|dG/dt|$ is greater than the predetermined value $\alpha$ so that the answer of step S7 is NO, the routine returns. By contrast, if the absolute value of the change rate of longitudinal acceleration $|dG/dt|$ is less than the predetermined value $\alpha$ so that the answer of step S7 is YES, the routine progresses to step S8. At step S8, a second elapsed time T2 is counted from a point at which the absolute value of the change rate of longitudinal acceleration $|dG/dt|$ is reduced less than the predetermined value $\alpha$, that is, from a point at which the affirmative determination was made at step S7 first time. Thereafter, the routine returns. Specifically, the second elapsed time T2 may be calculated by adding the cycle time of the routine to the second elapsed time T2 counted so far.

According to the exemplary embodiment of the present disclosure, after shifting the operating mode to the HV-Low mode, the speed of the engine 3 is increased to a first target speed Nep1 temporarily and quickly. Thereafter, the speed of the engine 3 is further increased to a second target speed Nep2 as a final target speed at a predetermined change rate $dNe/dt$. For example, the second target speed Nep2 may be set based on a required power to propel the vehicle in line with an optimum fuel efficiency curve. To this end, if the shifting operation of the operating mode from the fixed mode to the HV-Low mode has been completed so that the answer of step S5 is YES, the routine progresses to step S9 to calculate the first target speed Nep1. According to the exemplary embodiment of the present disclosure, the first target speed Nep1 is set to a level at which the driver is allowed to recognize that the speed of the engine 3 is increased by depressing the accelerator pedal. Specifically, the longer the first elapsed time T1, the first target speed Nep1 is set to a smaller value, and the longer the second elapsed time T2, the first target speed Nep1 is also set to a smaller value.

Figure 8:
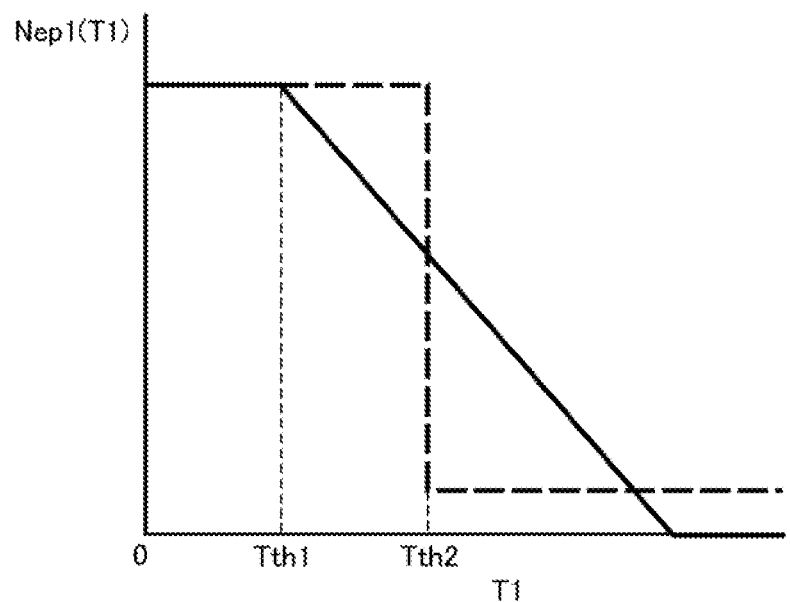
FIG. 8 is a map for determining a first provisional speed.

Here will be explained an example of a procedure to calculate the first target speed Nep1. As described, the first target speed Nep1 is set to a smaller value if the first elapsed time T1 is long. First of all, a first provisional speed Nep1(T1) is calculated based on the first elapsed time T1 counted at step S6 with reference to a map shown in FIG. 8 prepared based on a result of sensory test. In the map shown in FIG. 8, the horizontal axis represents the first elapsed time T1, and the vertical axis represents the first provisional speed Nep1(T1). In order to calculate the first provisional speed Nep1(T1), an acceptable upper limit value of the speed of the engine 3 at which the driver does not feel uncomfortable feeling is calculated with respect to the elapsed time from the point at which the depression of the accelerator pedal was increased. In FIG. 8, the solid line represents the first provisional speed Nep1(T1), and according to the exemplary embodiment of the present disclosure, the first provisional speed Nep1(T1) is set to a predetermined percentage of the above-mentioned acceptable upper limit value of the speed of the engine 3. As indicated by the solid line in FIG. 8, the first provisional speed Nep1(T1) may be reduced linearly in accordance with the lapse of time from a first time point Tth1 set after the commencement of the counting of the first elapsed time T1 at step S6. Instead, as indicated by the dashed line in FIG. 8, the first provisional speed Nep1(T1) may also be reduced stepwise at a second time point Tth2 set after the first time point Tth1.

Figure 9:
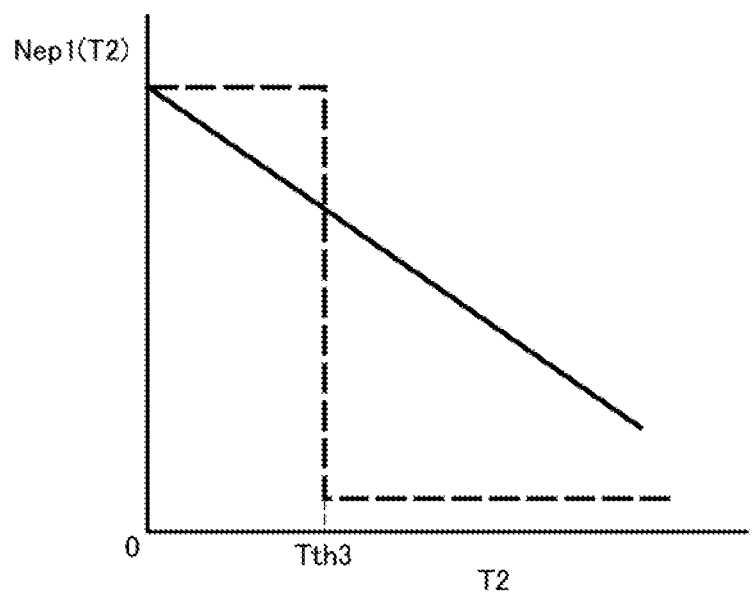
FIG. 9 is a map for determining a second provisional speed.

As also described, the first target speed Nep1 is also reduced if the second elapsed time T2 is long. Therefore, in order to calculate the first target speed Nep1, a second provisional speed Nep1(T2) is calculated based on the second elapsed time T2 with reference to a map shown in FIG. 9 prepared based on a result of sensory test. In the map shown in FIG. 9, the horizontal axis represents the second elapsed time T2, and the vertical axis represents the second provisional speed Nep1(T2). In order to calculate the second provisional speed Nep1(T2), an acceptable upper limit value of the speed of the engine 3 at which the driver does not feel uncomfortable feeling is calculated with respect to the elapsed time from the point at which the absolute value of the change rate of longitudinal acceleration |dG/dt| has fallen below the predetermined value α. In FIG. 9, the solid line represents the second provisional speed Nep1(T2), and according to the exemplary embodiment of the present disclosure, the second provisional speed Nep1(T2) is set to a predetermined percentage of the above-mentioned acceptable upper limit value of the speed of the engine 3. As indicated by the solid line in FIG. 9, the second provisional speed Nep1(T2) may be reduced linearly in accordance with the lapse of time. Instead, as indicated by the dashed line in FIG. 9, the second provisional speed Nep1(T2) may also be reduced stepwise at a third time point Tth3 set after the commencement of the counting of the second elapsed time T2. Thereafter, a third provisional speed Nep1(T1, T2) is calculated by adding the first provisional speed Nep1(T1) to the second provisional speed Nep1(T2).

Figure 10:
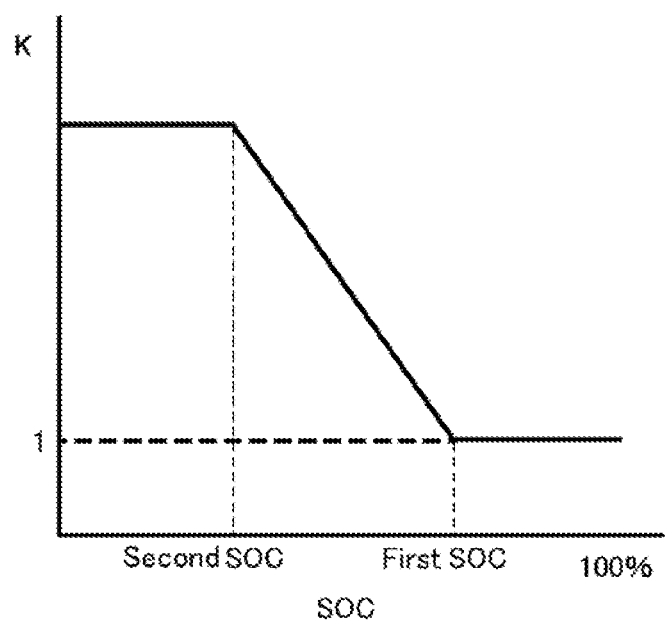
FIG. 10 is a map for determining a coefficient in accordance with a state of charge level.

Thus, the first provisional speed Nep1(T1) and the second provisional speed Nep1(T2) are set in such a manner that the speed of the engine 3 is reduced in accordance with the first elapsed time T1 and the second elapsed time T2. Therefore, before the speed of the engine 3 is raised to the second target speed Nep2, a shortfall of the output power of the engine 3 with respect to the target power is assisted by the output torque of the second motor 5. However, a maximum possible drive power generated by the second motor 5 may be restricted depending on the SOC level of the electric storage device 30. If the speed of the engine 3 is set to an excessively low speed, the output power of the engine is reduced excessively thereby reducing the drive force to propel the vehicle temporarily. In this situation, the second motor 5 may not generate an assist torque sufficiently to compensate the shortfall of the output power of the engine 3 with respect to the target power, if the drive power of the second motor 5 is restricted significantly. Therefore, in order not to set the speed of the engine 3 to an excessively low speed, the third provisional speed Nep1(T1, T2) calculated by adding the first provisional speed Nep1(T1) to the second provisional speed Nep1(T2) is multiplied by a coefficient K calculated in accordance with the SOC level of the electric storage device 30 with reference to a map shown in FIG. 10. That is, a fourth provisional speed Nep1 (T1, T2, K) is calculated by multiplying the third provisional speed Nep1 (T1, T2) by the coefficient K. In FIG. 10, the horizontal axis represents the SOC level of the electric storage device 30, and the vertical axis represents the coefficient K. As can be seen from FIG. 10, the coefficient K is set to "1" if the SOC level of the electric storage device 30 is higher than a first SOC level, and increased with a reduction in the SOC level of the electric storage device 30 from the first SOC level. When the SOC level of the electric storage device 30 falls to a second SOC level, the coefficient K is increased to a maximum value.

If the fourth provisional speed Nep1 (T1, T2, K) is set lower than the speed of the engine 3 at the point when the operating mode is shifted from the fixed mode to the HV-Low mode, the speed of the engine 3 will be reduced temporarily during the transient state of increasing the speed of the engine 3 to the second target speed Nep2. In order to prevent such temporal drop in the speed of the engine 3 during the transient state of increasing the speed of the engine 3 to the second target speed Nep2, the speed of the engine 3 at the point when the operating mode is shifted from the fixed mode to the HV-Low mode is employed as a lower limit guard value. By contrast, if the fourth provisional speed Nep1 (T1, T2, K) is set higher than the second target speed Nep2, the speed of the engine 3 will be increased higher than the second target speed Nep2 temporarily and then reduced to the second target speed Nep2, during the transient state of increasing the speed of the engine 3 to the second target speed Nep2. In order to prevent such temporal rise in the speed of the engine 3 during the transient state of increasing the speed of the engine 3 to the second target speed Nep2, the second target speed Nep2 serves as an upper limit guard value. Specifically, if the fourth provisional speed Nep1 (T1, T2, K) is set between the lower limit guard value and the upper limit guard value, the fourth provisional speed Nep1 (T1, T2, K) is employed as the first target speed Nep1. If the fourth provisional speed Nep1 (T1, T2, K) is lower than the lower limit guard value, the lower limit guard value is employed as the first target speed Nep1. If the fourth provisional speed Nep1 (T1, T2, K) is higher than the upper limit guard value, the upper limit guard value is employed as the first target speed Nep1.

Turning back to FIG. 7, after thus calculating the first target speed Nep1 at step S9, it is determined at step S10 whether an actual speed of the engine 3 reaches the first target speed Nep1. For example, the actual speed of the engine 3 may be calculated based on a speed detected by the vehicle speed sensor and the gear ratio of the power split mechanism 6. Instead, the actual speed of the engine 3 may also be detected by an additional engine speed sensor that detects a speed of the engine 3 directly.

If the actual speed of the engine 3 has not yet reached the first target speed Nep1 so that the answer of step S10 is NO, the routine progresses to step S11 to calculate a first target change rate dNe/dt1 employed to increase the speed of the engine 3 until the speed of the engine 3 reaches the first target speed Nep 1. In the HV-Low mode, the speed of the engine 3 may be changed by controlling the speed of the first motor 4. Therefore, the first target change rate dNe/dt1 is set to a maximum increasing rate possible to be achieved by the current maximum output power of the electric storage device 30 and a current maximum output power of the first motor 4.

By contrast, if the actual speed of the engine 3 has reached the first target speed Nep1 so that the answer of step S10 is YES, the routine progresses to step S12 to calculate a second target change rate dNe/dt2 employed to increase the speed of the engine 3 until the speed of the engine 3 reaches the second target speed Nep2. Specifically, the second target change rate dNe/dt2 is calculated using the following formula:

$$dNe/dt2 = C1 \cdot G + C2 \cdot pap + C3 \cdot V$$

where G is a longitudinal acceleration of the vehicle, pap is a position of the accelerator pedal, V is a speed of the vehicle, and C1, C2, and C3 are coefficients set in line with a change rate of the engine 3 expected by the driver set based on a result of a sensory test.

After calculating the target change rate at step S11 or S12, it is determined at step S13 whether the actual speed of the engine 3 reaches the second target speed Nep2. If the actual speed of the engine 3 has not yet reached the second target speed Nep2 so that the answer of step S13 is NO, the routine progresses to step S14 to determine whether the accelerator pedal is depressed deeper than a predetermined position (or angle). As described, according to the example shown in FIG. 7, the output power of the engine 3 is restricted so as to suppress an increase in the speed of the engine 3. That is, if a relatively large drive force is required e.g., when accelerating the vehicle promptly, the required drive force may not be achieved. In this case, therefore, the speed of the engine 3 is increased to the target speed at the maximum increasing rate without setting the first target speed Nep1. To this end, the predetermined position of the accelerator pedal is set to a position at which the vehicle can be accelerated promptly.

If a depression of the accelerator pedal is shallower than the predetermined position so that the answer of step S14 is NO, the routine returns. If the actual speed of the engine 3 has reached the second target speed Nep2 so that the answer of step S13 is YES, and if the depression of the accelerator pedal is deeper than the predetermined position so that the answer of step S14 is YES, the routine progresses to step S15 to turn off the execution flag F, and further progresses to step S16 to reset the first elapsed time T1 and the second elapsed time T2. Thereafter, the routine returns.

Figure 7:
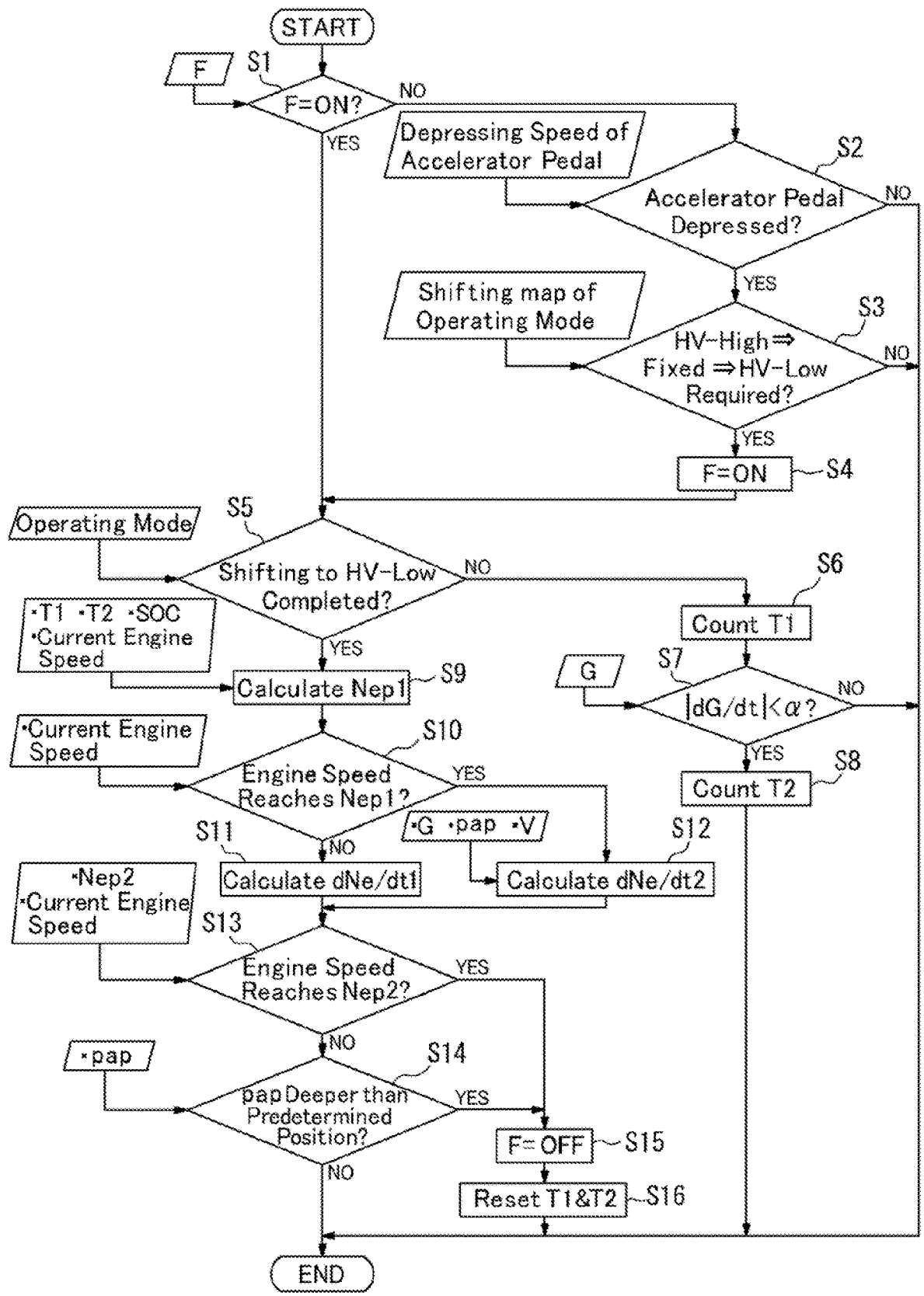
FIG. 7 is a flowchart showing one example of a routine executed by the control system according to the exemplary embodiment of the present disclosure.
Figure 11:
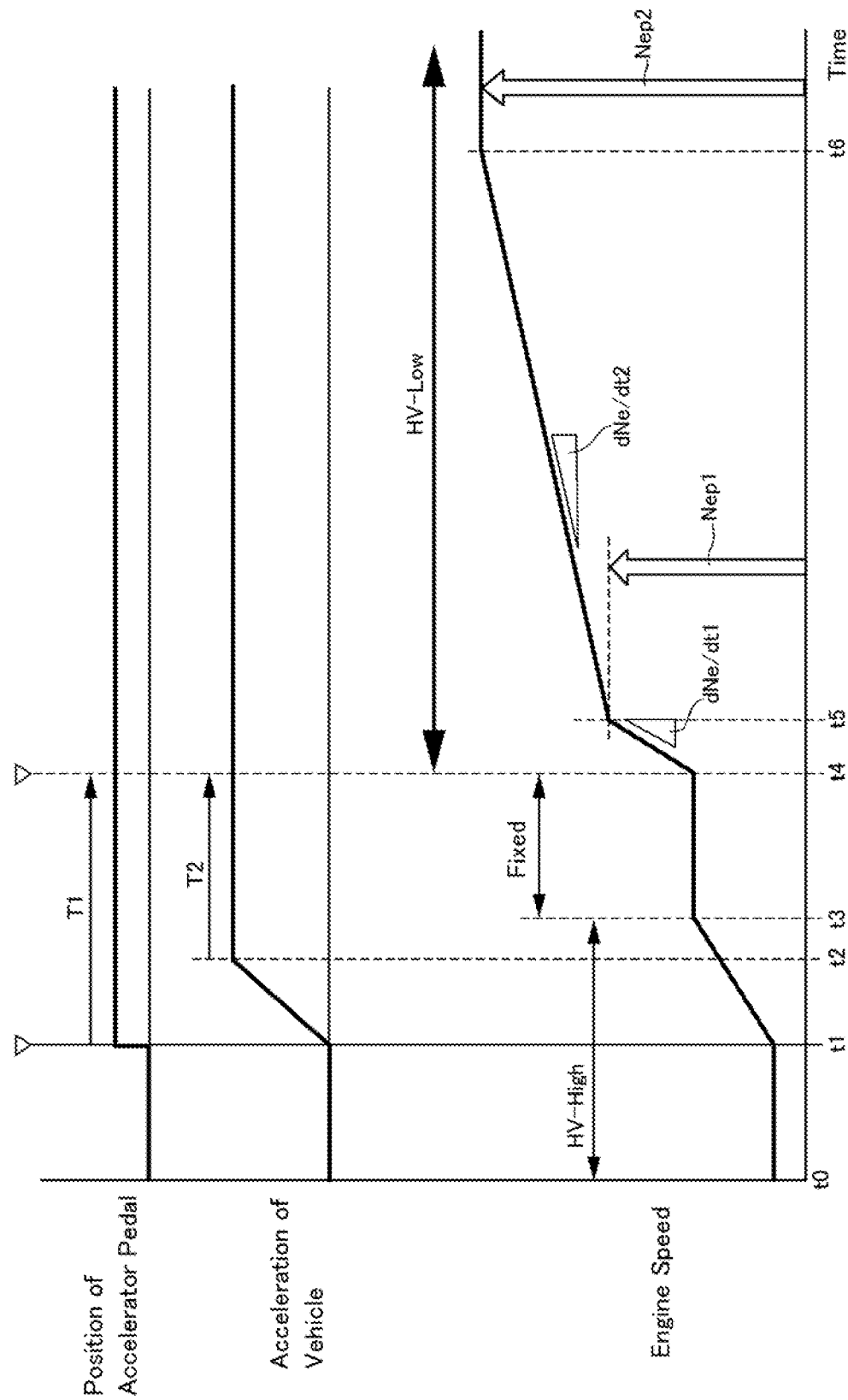
FIG. 11 is a time chart showing a temporal change in the speed of the engine during execution of the routine shown in FIG. 7 in a case that the first elapsed time and the second elapsed time are relatively short, and the state of charge level is high.

Examples of a temporal change in the speed of the engine 3 during execution of the routine shown in FIG. 7 is indicated in FIGS. 11 to 14. Specifically, FIG. 11 shows an example in which the first elapsed time T1 and the second elapsed time T2 are relatively short, and the SOC level of the electric storage device 30 is higher than the first SOC level.

At point t0, a position of the accelerator pedal is maintained to cruise the vehicle. In this situation, therefore, the longitudinal acceleration of the vehicle is substantially zero. Specifically, at point t0, the vehicle is propelled in the HV-High mode, and the speed of the engine 3 is maintained to a relatively low speed at which the engine 3 is allowed to generate a required power to propel the vehicle in an optimally fuel efficient manner.

At point t1, the accelerator pedal is further depressed so that the determination of satisfaction of the condition to shift the operating mode from the HV-High mode to the HV-Low mode is made at step S3. Consequently, the counting of the first elapsed time T1 is commenced at point t1. In this situation, torques of the engine 3 and the second motor 5 are controlled to generate a drive force in accordance with the position of the accelerator pedal increased at point t1. Consequently, the longitudinal acceleration of the vehicle starts increasing at point t1, and becomes constant at point t2 when the required drive force is achieved. As a result, the counting of the second elapsed time T2 is commenced at point t2.

In order to shift the operating mode from the HV-High mode to the fixed mode, the speed of the engine 3 is increased from point t1 to synchronize a speed of the carrier 12 with a speed of the carrier 18 thereby engaging the first clutch CL1. Specifically, the speed of the carrier 12 connected to the engine 3 is increased by controlling an output torque of the first motor 4 at the maximum increasing rate governed e.g., by the upper limit torque of the first motor 4.

The speed of the carrier 12 is synchronized with the speed of the carrier 18 at point t3 so that the operating mode is shifted to the fixed mode. In this situation, given that the dog clutch is adopted as the second clutch CL2, torque applied to the second clutch CL2 is reduced by increasing torque applied to the first clutch CL1 so as to disengage the second clutch CL2. After thus reducing the torque applied to the second clutch CL2, the second clutch CL2 is disengaged at point t4 to shift the operating mode from the fixed mode to the HV-Low mode. Consequently, the routine shown in FIG. 7 progresses from step S5 to step S9 to calculate the first target speed Nep1.

Specifically, FIG. 11 shows an example in which the first elapsed time T1 is shorter than a period to the first time point Tth1 shown in FIG. 8, the second elapsed time T2 is shorter than a period to the third time point Tth3 shown in FIG. 9, and the SOC level of the electric storage device 30 is higher than the first SOC level. In the example shown in FIG. 11, therefore, the first target speed Nep1 is calculated at point t4 by adding the first provisional speed Nep1(T1) to the second provisional speed Nep1(T2).

In this case, the speed of the engine 3 is increased from point t4 toward the first target speed Nep1 at the first target change rate dNe/dt1 calculated at step S11. The speed of the engine 3 is further increased from point t5 toward the second target speed Nep2 at the second target change rate dNe/dt2 calculated at step S12. Consequently, the speed of the engine 3 reaches the second target change rate dNe/dt2 at point t6.

As described, the first provisional speed Nep1(T1) and the second provisional speed Nep2(T1) are calculated based on the first elapsed time T1 and the second elapsed time T2 determined with reference to the maps prepared based on a result of the sensory test, and the first target speed Nep1 is calculated based on the first provisional speed Nep1(T1) and the second provisional speed Nep2(T1). According to the example shown in FIG. 11, therefore, the driver is allowed to recognize that the speed of the engine 3 is increased in accordance with an operation of the accelerator pedal, even if the speed of the engine 3 is increased after shifting the operating mode to the HV-Low mode. That is, uncomfortable feeling of the driver can be reduced.

Figure 12:
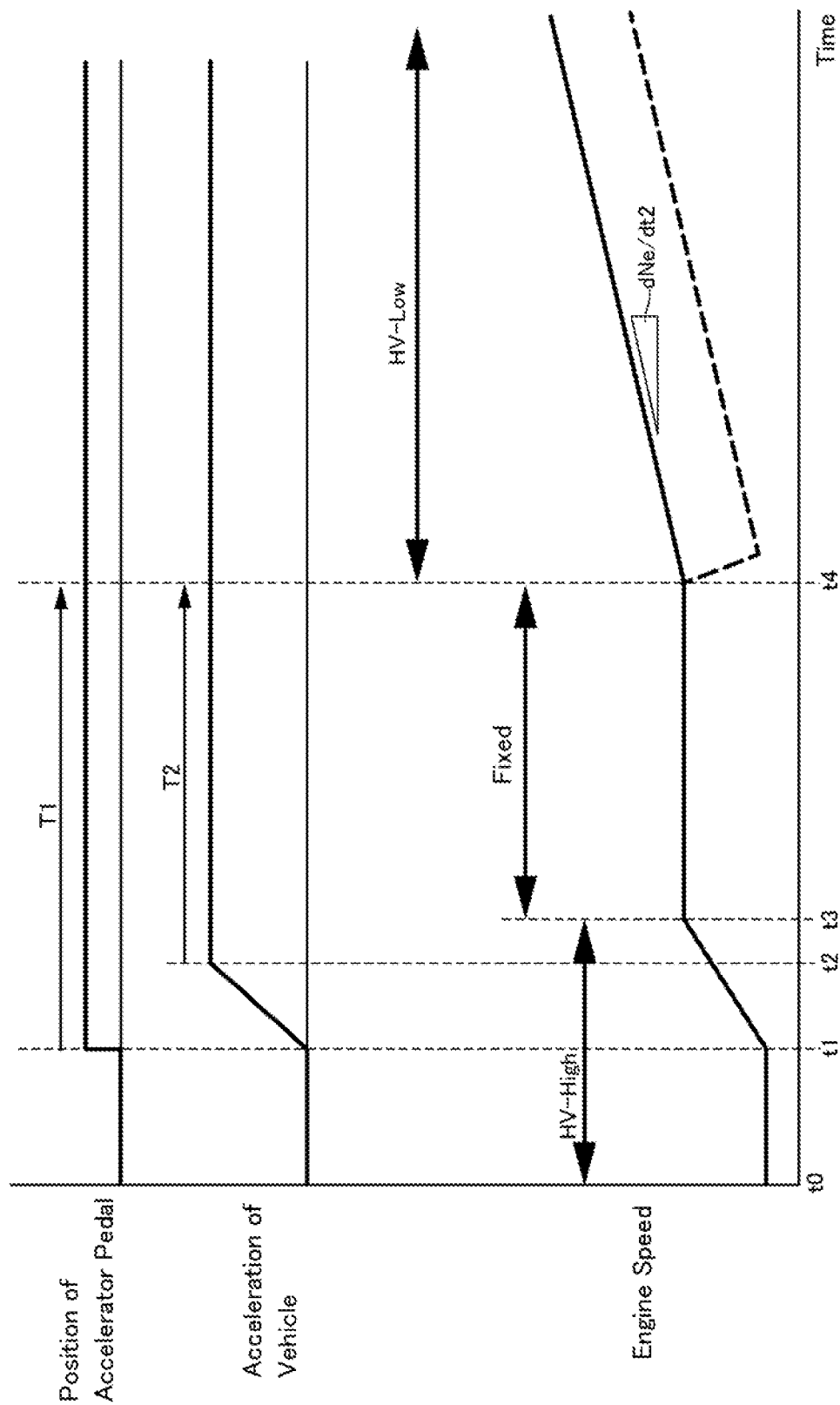
FIG. 12 is a time chart showing a temporal change in the speed of the engine during execution of the routine shown in FIG. 7 in a case that the first elapsed time and the second elapsed time are relatively long, and the state of charge level is high.

FIG. 12 shows an example in which the first elapsed time T1 and the second elapsed time T2 are relatively long, and the SOC level of the electric storage device 30 is higher than the first SOC level. In this case, conditions of the vehicle from point t0 to point t4 are similar to those of the case shown in FIG. 11 except for lengths of the first elapsed time T1 and the second elapsed time T2, therefore, detailed explanation for the events occur between points t0 and t4 will be omitted. Specifically, FIG. 12 shows the example in which the first elapsed time T1 is longer than a period to the second time point Tth2 shown in FIG. 8, and the second elapsed time T2 is longer than the period to the third time point Tth3 shown in FIG. 9. In this case, therefore, the third provisional speed Nep1(T1, T2) is set to a small value, and since the SOC level of the electric storage device 30 is higher than the first SOC level, the coefficient K is set to 1. For this reason, the fourth provisional speed Nep1 (T1, T2, K) is set below the actual speed of the engine 3 from point t4 as indicated by the dashed line. In the example shown in FIG. 12, therefore, the first target speed Nep1 is set to the speed of the engine 3 at point t4, and the routine shown in FIG. 7 progresses from step S10 to step S12. That is, the speed of the engine 3 is not increased toward the first target speed Nep1 but to the second target speed Nep2 calculated at step S12 at the second target change rate dNe/dt2.

Thus, in the case that the fourth provisional speed Nep1 (T1, T2, K) is lower than the speed of the engine 3 at the point when the operating mode is shifted to the HV-Low mode, the speed of the engine 3 at the point when the operating mode is shifted to the HV-Low mode is employed as the lower limit guard value. According to the example shown in FIG. 12, therefore, unintentional drop in the speed of the engine 3 can be prevented to reduce uncomfortable feeling of the driver.

Figure 13:
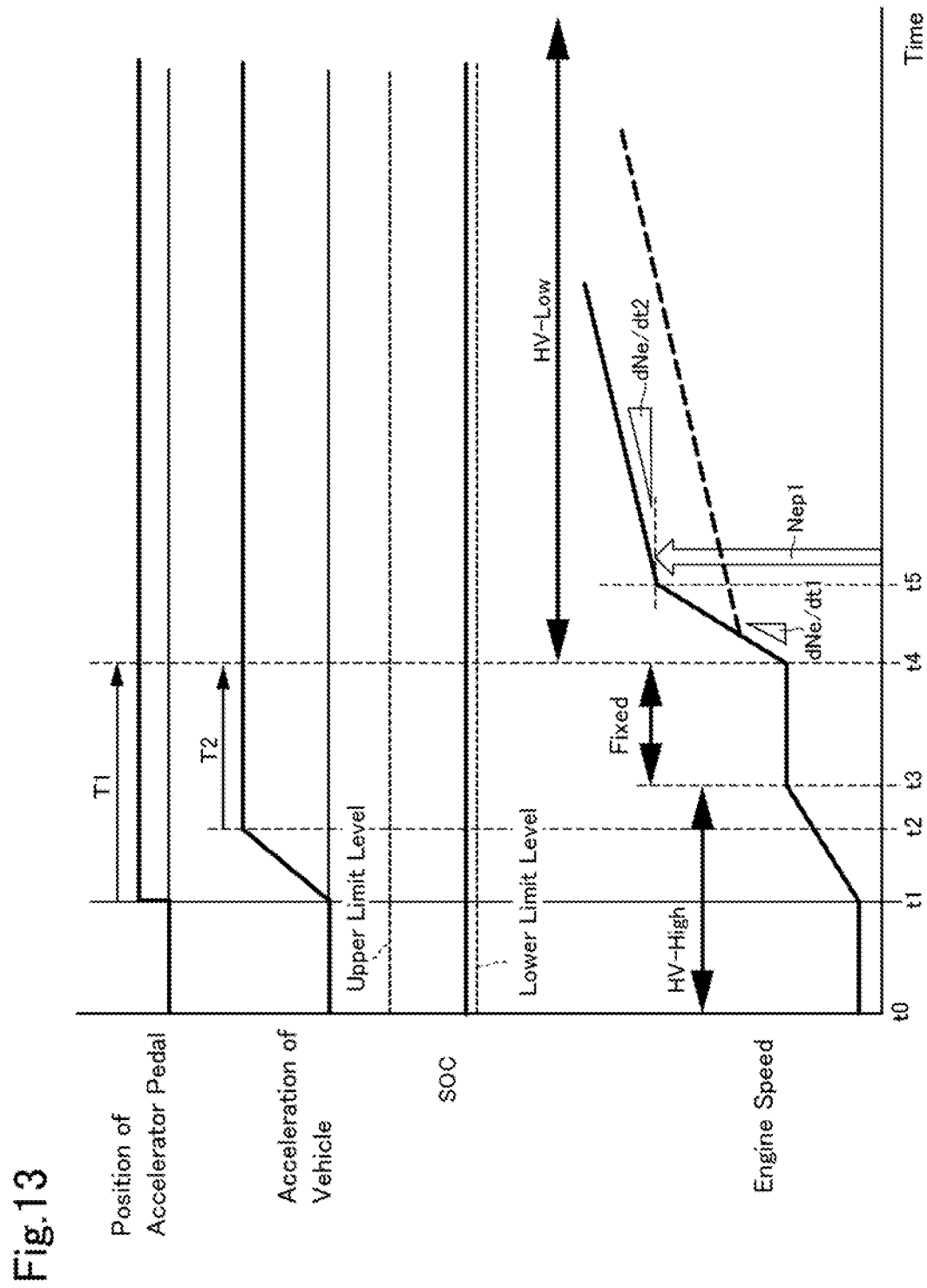
FIG. 13 is a time chart showing a temporal change in the speed of the engine during execution of the routine shown in FIG. 7 in a case that the state of charge level is low.

FIG. 13 shows an example in which the SOC level of the electric storage device 30 is lower than the second SOC level, and the first target speed Nep1 calculated at step S4 is set to a high speed. In this case, specifically, the coefficient K is set to the maximum value so that the speed of the engine 3 is maintained to the high speed level and the output power of the engine 3 is increased, compared to the case in which the SOC level of the electric storage device 30 is higher than the first SOC level. That is, the output power of the second motor 5 is reduced. As a result, drop in the drive force due to reduction in the SOC level of the electric storage device 30 is prevented. In other words, drop in the drive force is prevented in priority to reduce the uncomfortable feeling resulting from a rise in the speed of the engine 3.

Figure 14:
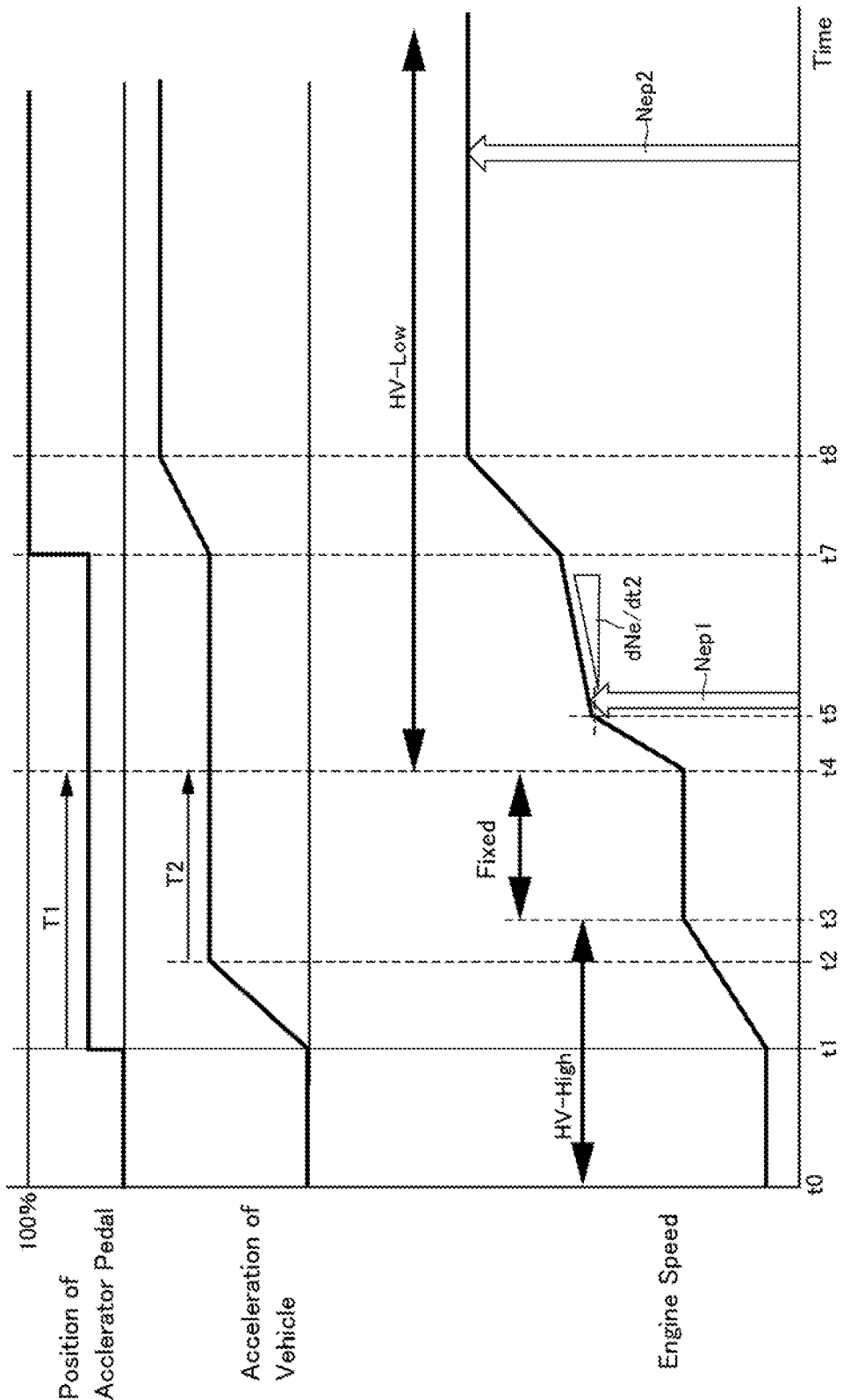
FIG. 14 is a time chart showing a temporal change in the speed of the engine during execution of the routine shown in FIG. 7 in a case that an accelerator pedal is depressed deeper than the predetermined position while increasing the speed of the engine from the first target speed to the second target speed.

FIG. 14 shows an example in which the accelerator pedal is depressed deeper than the predetermined position and the required drive force is increased to the predetermined value after shifting the operating mode to the HV-Low mode. In this case, conditions of the vehicle from point t0 to point t5 are similar to those of the case shown in FIG. 11. In the example shown in FIG. 15, after the speed of the engine 3 is increased to the first target speed Nep1 at point t5, and further increased from point t5 toward the second target speed Nep2 at the second target change rate dNe/dt2. Then, the accelerator pedal is further depressed deeper than the predetermined position at point t7 so that the execution flag F is turned off at step 14. Consequently, the routine shown in FIG. 7 is terminated and the speed of the engine 3 is increased at the maximum rate to achieve the required drive force in accordance with the position of the accelerator pedal. As a result, the speed of the engine 3 reaches the second target speed Nep2 at point t8.

Thus, in the case that the accelerator pedal is further depressed deeper than the predetermined position, the execution flag F is turned off to terminate the routine shown in FIG. 7. In this case, therefore, the speed of the engine 3 can be increased at the maximum rate instead of the second target change rate dNe/dt2 to achieve the required drive force. That is, the drive force is increased in priority to reduce the uncomfortable feeling resulting from a rise in the speed of the engine 3.

Although the above exemplary embodiments of the present disclosure have been described, it will be understood by those skilled in the art that the present disclosure should not be limited to the described exemplary embodiments, and various changes and modifications can be made within the scope of the present disclosure. For example, in the fixed mode, the speed ratio of the power split mechanism 6 may also be fixed to a ratio other than 1. Further, the first target speed Nep1 may be reduced with an increased in at least any one of the first elapsed time T1 and the second elapsed time T2.

What is claimed is:

1. A speed change control system for a vehicle, comprising:
an engine; and
a speed change mechanism that is connected to the engine,
wherein the speed change mechanism is adapted to shift an operating mode among
a first continuously variable mode in which a speed of the engine may be varied continuously,
a second continuously variable mode in which the speed of the engine may also be varied continuously, and
a fixed mode in which a speed ratio between the engine and a pair of drive wheels is fixed to a predetermined value,
the control system comprising a controller that controls the speed change mechanism,
wherein the controller is configured to
shift the operating mode between the first continuously variable mode and the second continuously variable mode via the fixed mode when a required drive force to propel the vehicle is increased,
increase the speed of the engine to a first target speed from a point at which the operating mode is shifted from the fixed mode to the second continuously variable mode,
further increase the speed of the engine to a second target speed calculated based on the required drive force, and
set the first target speed to a smaller value with an increase in at least any one of
a first elapsed time from a point at which the required drive force is increased to a point at which the operating mode is shifted from the fixed mode to the second continuously variable mode, and
a second elapsed time from a point at which a change rate of longitudinal acceleration of the vehicle is reduced less than a predetermined value to the point at which the operating mode is shifted from the fixed mode to the second continuously variable mode.

2. The speed change control system for the vehicle as claimed in claim 1,
wherein the vehicle further comprises:
a motor that is connected to the pair of drive wheels or another pair of drive wheels in a torque transmittable manner; and
an electric storage device that supplies electricity to the motor,
wherein the controller is further configured to achieve the required drive force by delivering a torque of the motor to the pair of drive wheels or the another pair of drive wheels in addition to deliver a torque of the engine to the pair of drive wheels, during a transitional state of shifting the operating mode from the first continuously variable mode to the second continuously variable mode, and increase the first target speed with a reduction in a state of charge level of the electric storage device.

3. The speed change control system for the vehicle as claimed in claim 1, wherein the controller is further configured to employ the speed of the engine at the point when the operating mode is shifted from the fixed mode to the second continuously variable mode as a lower limit guard value of the first target speed.

4. The speed change control system for the vehicle as claimed in claim 1, wherein the controller is further configured to employ the second target speed as an upper limit guard value of the first target speed.

5. The speed change control system for the vehicle as claimed in claim 1, wherein the controller is further configured to set an increasing rate of the speed of the engine to a maximum increasing rate, during a period from the point at which the operating mode is shifted from the fixed mode to the second continuously variable mode to a point at which the speed of the engine reaches the first target speed.

6. The speed change control system for the vehicle as claimed in claim 1, wherein the controller is further configured to calculate the increasing rate of the speed of the engine from the first target speed to the second target speed based on a speed of the vehicle, the longitudinal acceleration of the vehicle, and a position of an accelerator pedal.

7. The speed change control system for the vehicle as claimed in claim 6, wherein the controller is further configured to switch the increasing rate of the speed of the engine to a maximum increasing rate when the required drive force is increased greater than a predetermined value during a transitional state of increasing the speed of the engine from the first target speed to the second target speed.

* * * * *